Oct. 12, 1937.  E. B. G. LEFEVRE  2,095,416
JOINT FOR METAL LINKS
Filed Aug. 7, 1936
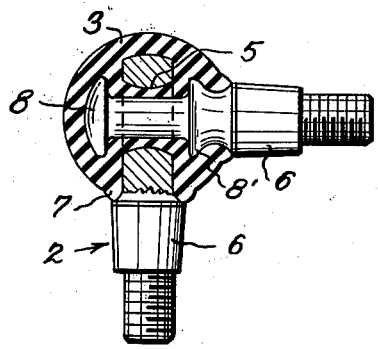
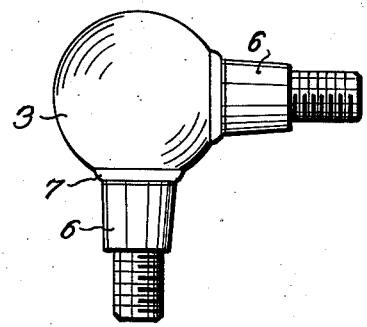
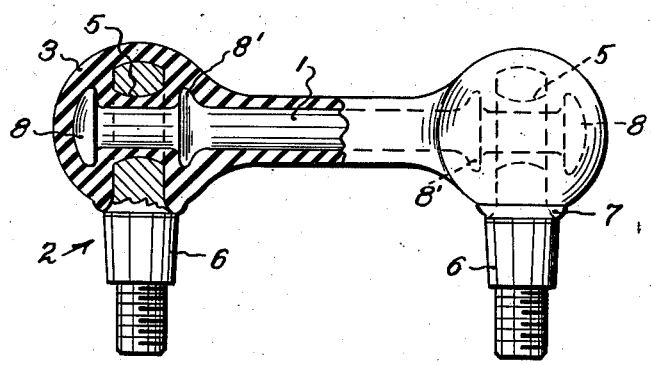
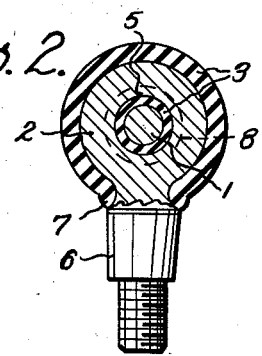
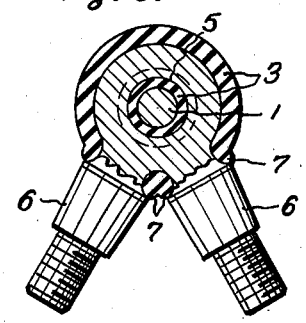
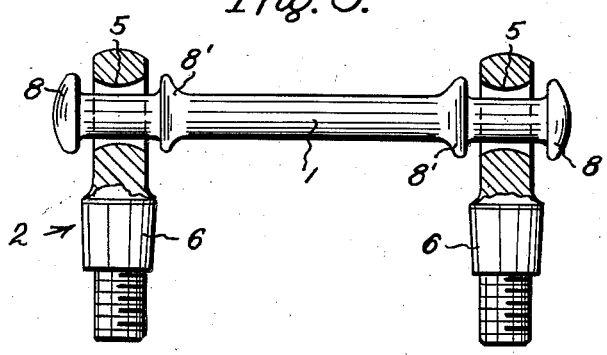
INVENTOR
Emil B. G. Lefevre
BY
Chapin & Neal
ATTORNEYS Patented Oct. 12, 1937

2,095,416

UNITED STATES PATENT OFFICE 2,095,416

JOINT FOR METAL LINKS

Emil B. G. Lefevre, Detroit, Mich.

Application August 7, 1936, Serial No. 94,813

1 Claim. (Cl. 74—579)

This invention relates to an improved joint construction for metal links. In addition to embodying the improvements substantially as disclosed in my copending application Serial No. 79,030, filed May 11, 1936, my present invention embodies a structural feature combined with my earlier filed disclosure and the use of which feature I consider will improve the working of the joint construction.

While my present application is closely related to my said copending application I desire to show herein all of the details of the earlier application which are combined with the new structural feature for a complete and independent disclosure of the best form of improved joint that I know of.

The improved joint construction may be used anywhere where joints having the functions of this one are desired. They are desired over a wide range of mechanical constructions. But they are particularly desirable in automobile construction because of the anti-rust function, the simplicity of construction with regard to the number of parts in the joint, the noiseless character of the joint, the character of movement in the joint, and many other advantages which will appear from a full disclosure of the way to practice the invention.

In the drawing:

Fig. 1 is a cross-section through a simple form of the improved joint;

Fig. 2 is a cross-section taken at right angles to the view of Fig. 1;

Fig. 3 is a side view of the finished joint of Fig. 1;

Fig. 4 is a view partly in section of a shock absorber link assembly such as may be used in a specific construction for automobile use;

Fig. 5 is a detail view of the metal parts of Fig. 4 in position for assembly; and Fig. 6 is a cross-section through a joint slightly different from that of Fig. 1.

Referring to Figs. 4 and 5, the link assembly here shown is arranged for use to connect the shock absorber arm of an automobile, to transmit movements through it, between the frame and running gear. This specifically illustrates one practical use of the improved joint, in which most of its advantages will appear.

The shock absorber link assembly comprises, as shown, a shaft 1 passing in spaced relation through the end eyes of studs 2, and covering rubber 3 encasing the assembly. The rubber is molded all around the metal parts, except the mere connecting ends 6 of the studs. Thus, we have a solid structure in which the studs are integrally mounted. The preferred form is to have the ends or heads of shaft 1 substantially as are the heads 8 illustrated, and larger than the eyes of the studs 2 and also to have flanges 8' substantially as illustrated and corresponding to heads 8 but spaced along the shaft.

Each flange 8', in Fig. 5, is arranged on its side of a stud eye in balanced position with head 8 on the other side of the same stud eye. Shaft 1 with its heads 8 and flanges 8' may be made integral, as I will describe later. The stud eyes are arranged parallel, at right angles to shaft 1, and everywhere spaced from the shaft. Solid rubber 3 fills all the spaces and, in addition, encases all of shaft 1, its heads 8, and flanges 8' and the eye portions of the studs, as will be seen in the sectional part of Fig. 4. The rubber gives the finished form of assembly at joints, as will be seen in the unsectioned part of Fig. 4, or in Fig. 3. It is preferable to have the rubber encase the whole shaft 1, as shown, but intermediate parts of the shaft may be exposed if desired for any reason.

The rubber of this assembly is molded and vulcanized on the metal parts. A solid composite structure of rubber and metal is preferred to a structure having any hollow space therein at the joint.

In addition to the broad features of invention in the structure, there is a specific feature which I consider of real importance to the best means of practicing the invention. This specific feature involves the conception of so making the structure that the adherence between the rubber and metal parts will avoid frictional movement between the rubber and metal in their composite mass at the joint. The best way I know of getting adherence for my purpose is to brass-plate the metal parts of steel. Then when the rubber is molded and vulcanized on the brass-plated steel there will be an exceptional adhesion or cling between meeting surfaces of rubber and metal parts. This adhesion has utility in the functional movements desired between the studs and shaft. These movements are within the stretching and compressing limits of the rubber in the solid assembly shown. With enough adhesion between the metal and rubber, all frictional movement between the parts will be avoided. As a consequence all movement between the parts will be resisted solely by the elasticity of the rubber body. There will be no surface friction and it is this ideal condition that I am striving to attain as nearly as possible in the best practice of my joint for metal links, particularly in a joint having the desired characteristics of a ball and socket joint without its disadvantages.

It is an incident, but an important one, in automobile work that my joint when made with the adhesion described is closed against any seeping action of oil, grit, or dirt into the area where the rubber and metal meet. In other words, the joint is made solid without even a crack entrance or interior sliding surfaces for foreign matter to act in the joint.

The advantage of providing the flanges 8' on one side of a stud eye, as shown, is to give substantially the same resistance to movement on that side as the head 8 gives on the other side. For example, if the structure and function of flanges 8' in Figs. 4 and 5 were discarded and not used, then an endwise push of sufficient force against shaft 1, acting from left to right in Fig. 4, would be resisted, in the right-hand joint by the tensioned elasticity of the rubber alone as head 8 moves outwardly to the right and bursts through its encasement. But with the provision of flange 8', it will be seen that such force to the right will now be resisted by the compression of rubber between flange 8' and the metal of the adjacent socket eye. Other examples of utility could be given, but the one is enough. The resistance of rubber to compression is exceedingly great as compared to its resistance to tension. Consequently, the structure and function of flanges 8', other features being the same, in my improved joint give enormously added strength and by a very simple structural addition. It is this additional feature of flange 8 and its function in the combination that principally distinguishes the present disclosure from that of my above mentioned copending application.

The solid structure of Figs. 4 and 5 may be compared to the prior art structure for the shock absorber link assembly used on Ford cars today. That prior structure has two ball-shaped metal casings joined to the ends of a connecting shaft. A rubber ball is held in each casing. And each rubber ball contains at its center the ball headed end of a stud, and the stud shank protrudes from its casing. It is a variation of a ball and socket arrangement in which the socket is merely lined with rubber. As compared to this prior art structure my improvement presents a casing of solid rubber, which casing does not need to be painted or refinished, and can stand the knocks and griefs of automobile use in exposed parts, and the rubber casing is a permanent protection against rust, not only of the casing itself, but of the contained metal parts. Furthermore, in my structure when the studs move within the limits of their intended universal movements, they compress part of the rubber and tension part and the whole body of rubber may enter into the action to distribute the load. In normal position the rubber is at rest and under no strain of either tension or compression. This provides for a long use of the rubber before fatigue sets in. This brief comparison with a specific prior art construction does not point out all the utilities in the improved structure, but enough to indicate definite improvement. There are fewer parts and they function better in many respects than the prior art.

With regard to the manufacture of my improvement, referring to Fig. 5: the shaft 1 may be formed integral with flanges 8' upset from the stock of the shaft as will be understood by metal workers. The shaft is then passed at each end through the eyes of stud 2 and the heads 8 made by mushrooming the shaft ends, left long enough for that purpose after forming flanges 8' and assembling with the studs 2. As described in my said copending case, where flanges 8' are not provided, the shaft 1 may be formed by simply welding or otherwise joining the two halves of the shaft at their ends opposite heads 8, after the so welded ends of the halves are passed through the stud eyes.

With shaft 1 assembled with the studs, as in Fig. 5, I proceed as follows. Unvulcanized rubber is packed in the rubber mold, all around the metal, the mold is closed, heat applied, and pressure maintained on the mold parts so that the rubber will flow in its heated plastic state to completely fill the mold and completely encase all parts of the metal except for the protruding ends 6 of the studs, and thus the heated molding operation vulcanizes the rubber and shapes it. The desired procedure in the molding step will be understood by the rubber molder and no further detail seems necessary for him, when he has the structural form of Fig. 4 or that of Figs. 3 and 6, and these directions to work from. In Fig. 4 it will be noted that I provide an integral rubber bead 7 where the rubber stops and the metal ends 6 of the stud appear in the finished structure. This is just a desirable point to avoid a feather-edge of the rubber which might tear if too thin at this junction, and the beads 7 improve appearance. I also round off the corners where heads 8 and flanges 8' meet the shaft. Of course many variations from the detail I have mentioned will occur to the manufacturer. For example, the shaft 1 may be made in two halves with the ends joined together by welding or otherwise. The shaft heads 8 and flanges 8' are preferably of the form as shown and are slightly larger than the eyes 5 of the studs. Instead of welding two shaft halves together as described they may have their small ends provided one with an integral threaded socket and one with a threaded reduced end, or the ends may be threaded and joined by a threaded sleeve. Of course when the shaft 1 is first made in two halves and then joined as described, a flange 8' may be made, as shown, integral with its half.

In Figs. 1, 2, and 3 I have indicated my invention in a joint structure of a type that may be used anywhere that a ball and socket joint of limited universal movement may be used, and with many advantages. The protruding ends of the studs of course will vary in form according to use to which the joint is put. In this single form of ball-shaped joint, the flange 8' is of especial utility because it prevents the possibility of forced protrusion of head 8. It may be used under conditions where there are not two heads 8 to help through shaft 1, as in Fig. 4. But in both cases, that of Fig. 4 as well as that of Fig. 1, I consider flange 8' arranged in the combination with head 8 at the same ball joint of considerable importance in the provision of means to give an improved structure of the character described.

In Fig. 6 I have indicated a joint with three link connections such as might be used in automobile link joints. Such constructions are particularly useful for the shock absorber link connections, the steering rod connections, radius rod connections, and in very many other connections where the function of slight universal movement is desired such as commonly given by a ball and socket joint or other forms of universal joints. In my improved construction in the forms shown the oscillating movement for the universal joint is about an imaginary point at the center of the stud eye 5. The movement will be approximately about such a point and head 8 with flange 8' combined with socket eye 2 will be kept spaced apart in each joint as encased in rubber so as to make a flexible and solid joint of improved character.

Having disclosed my invention and the means to practice it I desire to claim the invention both broadly and specifically, without limitation except as the prior art may require.

What I claim is:

An automobile shock absorber link construction for connecting the shock absorber arm to the running gear which comprises a metal link, metal studs provided with eyes through which the ends of the link extend, the ends of said link being provided with heads outwardly of the eyes and provided with flanges inwardly of the eyes, whereby the metal studs are loosely coupled to the opposite ends of the link, and a solid body of vulcanized rubber surrounding said link and the coupled portions of the studs, the same being embedded in and completely enclosed in said solid body of rubber, the coupled portions being bound together and held spaced from each other by the surrounding rubber, the entire outer surface of the rubber mass being substantially unconfined and free from external restraint, the longitudinal axes of the studs intersecting the longitudinal axis of the link, said heads and flanges being larger than the eyes of the studs and substantially equal to each other in size whereby internal compressional strains are equalized on both sides of the eyes.

EMIL B. G. LEFEVRE.